2,968,640

COMPOSITION COMPRISING STYRENE-BUTADIENE ELASTOMER, CARBON BLACK, AN AMINOTHIAZOLE DISULFIDE AND A CADMIUM COMPOUND AND METHOD FOR CURING SAME

Earl C. Gregg, Jr., Cuyahoga Falls, Ohio, assignor to The B. F. Goodrich Company, New York, N.Y., a corporation of New York No Drawing. Filed Jan. 19, 1959, Ser. No. 787,371

8 Claims. (Cl. 260—41.5)

This invention relates to new rubber vulcanizates and method for their preparation and more particularly pertains to novel styrene-butadiene rubber vulcanizates containing carbon black, aminoazole disulfide curing agents and cadmium salt activators and to the method for preparing said vulcanizates, said vulcanizates being characterized by their unusually good heat stability and high state of cure, said method being characterized by its unusually high rate of cure.

An object of this invention is the provision of novel styrene-butadiene rubber vulcanizates which resist degradation and overcuring on heat aging for extended periods of time. Another object is the provision of novel vulcanizates of styrene-butadiene rubber which maintain their rubbery state, even when subjected to prolonged periods of heat aging. Another object is the provision of rubber vulcanizates of the aforementioned type which exist in unusually high states of cure as measured by modulus values. Still another object is the provision of an unusually rapid method for preparing the aforementioned vulcanizates.

Still other objects and advantages of the present invention will appear from the more detailed description set forth below, it being understood that such detailed description is given by way of illustration and explanation only, and not by way of limitation, since various changes therein may be made by those skilled in the art without departing from the scope and spirit of the present invention.

I have discovered a novel rubber vulcanizate comprising 100 parts by weight of a sytrene-butadiene rubber, from about 20 to about 60 parts by weight of carbon black, from about 0.5 to about 10 parts by weight of an aminothiazole disulfide and from about 0.1 to about 3 moles of a cadmium salt per mole of said aminothiazole disulfide.

The styrene-butadiene rubbers or elastomers embodied in this invention are those commonly known in the past as GR-S and currently designated SBR rubbers, which are copolymers of styrene and butadiene in various monomer ratios. The styrene-butadiene copolymers which exhibit rubbery properties are those composed of more than 50 weight percent of butadiene and for the purposes of the present invention the most preferred styrene-butadiene copolymers are those resulting from the copolymerization of from 55 to 85 weight percent of butadiene and from 15 to 45 weight percent of styrene.

The aminoazole disulfide curing agents embodied in this invention are the compounds conforming to the structure $$R-S-S-N\diagup^{R_1}_{R_2}$$

wherein R represents a thiazole radical having from 3 to 14 carbon atoms such as 2-thiazyl-, 4-methyl-2-thiazyl-, 4-ethyl-2-thiazyl-, 4-n-propyl-2-thiazyl-, 4-n-butyl-2-thiazyl-, 4,5-di-n-propyl-2-thiazyl-, 4,5-di-n-butyl-2-thiazyl-, 4-phenyl-2-thiazyl-, 4-phenyl-5-methyl-2-thiazyl-, 2-benzothiazyl-, 4-phenyl-2-benzothiazyl, 6-phenyl-2-benzothiazyl-, 4-phenyl-2-benzothiazyl-, 6-phenyl-2-benzothiazyl-, 2-tetrahydrobenzothiazyl-, and 2-naphthothiazyl-; and $R_1$ and $R_2$ represent aliphatic groups having from 1 to 4 carbon atoms such as methyl, ethyl, n-propyl, isopropyl, n-butyl, isobutyl, sec-butyl; $R_1$ and $R_2$ represent cycloaliphatic groups having from 5 to 6 carbon atoms such as cyclopentyl and cyclohexyl; $R_1$ and $R_2$ represent aralkyl groups having from 7 to 10 carbon atoms such as benzyl and phenylethyl; $R_1$ and $R_2$ represent an aliphatic group having from 2 to 5 carbon atoms in which $R_1$ and $R_2$ are joined together, such as ethylene, trimethylene, tetramethylene and pentamethylene; and $R_1$ and $R_2$ represent alkylene groups having from 1 to 4 carbon atoms joined together through a chalcogen atom having an atomic weight less than about 33, such as diethylene oxide and diethylene sulfide and the like and others. The most preferred of this group are 2-benzothiazyl-N-morpholinyl disulfide, 2-benzothiazyl-N-thiomorpholinyl disulfide, 2-benzothiazyl-N-(N'-methylpiperazinyl) disulfide, 2-benzothiazyl-N-piperidinyl disulfide and the like, and the useful range is from about 0.5 to about 10 parts by weight based on 100 parts by weight of rubber. The most preferred range is from about 2 to about 6 parts by weight based on 100 parts by weight of rubber.

The cadmium salts useful as activators in this invention include $Cd(OH)_2$, $CdCO_3$, $CdO$, $CdS$, $Cd(CN)_2$, $CdCl_2$, $CdBr_2$, $CdF_2$, $CdI_2$, $CdSO_4$, $Cd(NO_3)_2$, $Cd_3(PO_4)_2$, $Cd_2P_2O_7$, $Cd_2Cl_2S$,

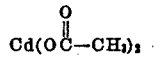

$Cd(BrO_3)_2 \cdot H_2O$, $Cd(ClO_3)_2$, $CdS_2O_6$,

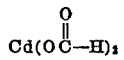

$Cd(IO_3)_2$, $Cd(MnO_4)_2$, $Cd(H_2PO_4)_2$, $CdSiO_3$, $CdSO_3$, cadmium salicylate, cadmium oxalate and the like. The preferred cadmium salts for the purpose of this invention are cadmium carbonate, cadmium hydroxide, cadmium oxide, cadmium salicylate and a cadmium halide in the range of from about 0.1 mole to about 3 moles and more preferred from about 0.2 to about 2 moles of the cadmium salt per mole of aminoazole disulfide in the recipe.

The present invention involves non-elemental sulfur curing of styrene-butadiene rubbers. It is known that cadmium oxide, for example, is not the equivalent of the commonly used activator, zinc oxide, when used in recipes in which the most generally used non-sulfur curing agent, tetramethyl thiuram disulfide (TMTD), is employed. It is, indeed, wholly unexpected that cadium salts, and particularly those of the preferred types herein described, should be found to give vulcanizates of the types embodied herein having properties superior to those found in the corresponding zinc oxide recipes. The use of cadmium salts in this invention causes the rate of cure of the vulcanizates to increase markedly from the rates obtained with zinc oxide, for example. Increased cure rates plus the other desirable properties mentioned hereinbefore in regard to the vulcanizates of this invention all contribute to produce commercial advantages over prior art styrene-butadiene rubber vulcanizates which will be apparent to those skilled in the art.

In reinforcing the rubbers embodied in the present invention, a minor amount of carbon black pigment is generally used with a major amount of rubbery material. Preferably, in order to obtain the best results, the composition will contain from about 30 to 60 parts by weight

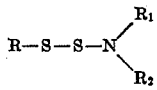

of the pigment based on 100 parts by weight of the rubbery material, exclusive of other compounding ingredients.

Appropriate compounding ingredients such as fillers, accelerators, plasticizers, antioxidants, age resistors, resins, dyes, color pigments, fungicides and the like can be employed with the rubbery compositions disclosed herein, in the amounts customarily employed in the rubber industry, depending upon the ultimate use of the product.

The rubber stocks comprising the styrene-butadiene rubber, carbon black, aminothiazole disulfide and cadmium salt and other appropriate compounding ingredients are prepared by mill mixing, Banbury mixing and the like at temperatures not exceeding about 280° F. The aminothiazole disulfide can be added before or after this mixing operation. It is generally preferred to mill the curing agent into the stock subsequent to the Banbury mixing, for example, when the Banbury mixing temperatures exceed about 280° F. in order to avoid the possibility of premature curing of the rubber stock. On the other hand, when temperatures below about 280° F. and preferably below 260° F. are employed, the curing agent can be added prior to the Banbury mixing operation. The stocks are then cooled, sheeted or extruded, placed in molds if desired and cured. Curing temperatures will vary but are generally in the range of about 260 to about 320° F. The cure times will vary with the degree of cure desired.

The products of the present invention will find utility as rubbery compositions especially useful for tire treads, and also will be useful in sidewalls of tires, carcass stocks, V-belts, gloves, shoe soles, heels, printing rollers, cutless bearings, colored rubbery articles and wherever it is desirable to provide a heat-resistant elastomer reinforced with carbon black.

In the following examples, which serve to illustrate a means for practicing this invention, amounts of all ingredients are given in parts by weight unless otherwise indicated.

*Example I*

The base compounding recipe used in this example was the following:

Copolymer of about 71 parts butadiene-1,3 and 29 parts of styrene _____ 100
Carbon black (ISAF) _____ 42
Stearic acid _____ 1.5
Age resistor (diphenylamine-acetone reaction product) _____ 1.0
2-benzothiazyl-N-morpholinyl disulfide (BMD) ____ 4.5
Metal salt activator _____ Variable

| Activator | | | | | | |
|---|---|---|---|---|---|---|
| Zinc oxide | 3.0 | 2.0 | 1.0 | | | |
| ZnO/BMD mole ratio | 2.3 | 1.6 | 0.8 | | | |
| Cadmium oxide | | | | 3.0 | 2.0 | 1.0 |
| CdO/BMD mole ratio | | | | 1.5 | 1.0 | 0.5 |

[Cure at 302° F.]

| | Minutes | A.C.S. Stress-Strain at 25° C. | | | | | |
|---|---|---|---|---|---|---|---|
| 300% Mod. p.s.i. | 90 | 2,050 | 2,050 | 1,650 | 1,050 | 1,500 | 2,150 |
| Tensile, p.s.i. | 90 | 3,800 | 3,850 | 4,100 | 3,700 | 2,800 | 3,700 |
| Elongation, percent | 90 | 470 | 460 | 550 | 670 | 560 | 450 |

[Mooney scorch at 302° F.]

| Cure rate, Mooney units/Minute | 2.6 | 2.8 | 3.7 | 25 | 21 | 15 |
|---|---|---|---|---|---|---|

| | Minutes | Aged 7 Days at 100° C., then A.C.S. Stress-Strain at 25° C. | | | | | |
|---|---|---|---|---|---|---|---|
| 300% Mod. p.s.i. | 80 | 2,650 | 2,450 | 1,800 | 1,100 | 1,350 | 2,100 |
| Tensile, p.s.i. | 80 | 3,100 | 3,000 | 3,450 | 3,150 | 3,300 | 3,000 |
| Elongation, percent | 80 | 330 | 350 | 490 | 630 | 600 | 400 |
| Percent Elong. retained | 80 | 70 | 76 | 89 | 96 | 100 | 91 |

It can be seen that a faster rate of cure and improved aging based on retention of elongation and modulus is effected by cadmium oxide. The use of 2-benzothiazyl-N-thiomorpholinyl disulfide, 2-benzothiazyl-N-piperidinyl disulfide and 2-benzothiazyl-N-(N'-methyl piperazinyl) disulfide in place of 2-benzothiazyl-N-morpholinyl disulfide in the above recipe gave comparable vulcanizates.

*Example II*

The base recipe described in Example I was used in this example.

| Cadmium hydroxide | 0.59 | 1.16 | 1.75 | 2.3 |
|---|---|---|---|---|
| Cd(OH)₂/BMD mole ratio | 0.25 | 0.50 | 0.75 | 1.0 |

[Cure at 302° F.]

| | Minutes | A.C.S. Stress-Strain at 25° C. | | | |
|---|---|---|---|---|---|
| 300% Modulus, p.s.i. | 90 | 2,200 | 1,990 | 1,600 | 1,350 |
| Tensile, p.s.i. | 90 | 3,800 | 3,650 | 4,050 | 3,950 |
| Elongation, percent | 90 | 440 | 450 | 560 | 620 |

[Mooney scorch at 302° F.]

| Cure rate, Mooney units/Minute | 11 | 14 | 19 | 27 |
|---|---|---|---|---|

| | Aged 7 Days at 100° C., then A.C.S. Stress-Strain at 25° C. | | | |
|---|---|---|---|---|
| 300% Modulus, p.s.i. | 2,100 | 1,900 | 1,420 | 1,150 |
| Tensile, p.s.i. | 2,820 | 3,150 | 3,250 | 3,050 |
| Elongation, percent | 380 | 450 | 560 | 620 |
| Percent Elong. retained | 84 | 100 | 100 | 100 |

It can be seen that a fast rate of cure and excellent aging based on retention of elongation is effected by cadmium oxide.

*Example III*

The base recipe described in Example I was used.

| Cadmium carbonate | 0.64 | 1.36 | 2.7 |
|---|---|---|---|
| CdCO₃/BMD mole ratio | 0.25 | 0.5 | 1.0 |

[Cure at 302° F.]

| | Minutes | A.C.S. Stress-Strain at 25° C. | | |
|---|---|---|---|---|
| 300% Mod., p.s.i. | 60 | 2,200 | 2,500 | 2,450 |
| Tensile, p.s.i. | 60 | 3,600 | 3,650 | 3,850 |
| Elongation, percent | 60 | 420 | 400 | 420 |

[Mooney scorch at 302° F.]

| Cure rate, Mooney units/Minute | | 7.5 | 9 | 11 |
|---|---|---|---|---|

| | Aged 7 Days at 100° C., then A.C.S. Stress-Strain at 25° C. | | | |
|---|---|---|---|---|
| 300% Modulus, p.s.i. | 60 | 2,300 | 2,450 | 2,200 |
| Tensile, p.s.i. | 60 | 3,000 | 3,250 | 3,600 |
| Elongation, percent | 60 | 360 | 370 | 440 |
| Percent Elongation retained | 60 | 88 | 92 | 100 |

Improved aging is evident based on retention of elongation and a fast rate of cure occurs.

Example IV

The base compounding recipe described in Example I was used.

| Cadmium salicylate | 1.53 | 3.06 | | |
|---|---|---|---|---|
| Cadmium salicylate/BMD mole ratio | 0.25 | 0.5 | | |
| Cadmium chloride | | | 1.44 | 2.9 |
| CdCl$_2$/BMD mole ratio | | | 0.5 | 1.0 |

[Cure at 302° F.]

| | Minutes | A.C.S. Stress-Strain at 25° C. | | | |
|---|---|---|---|---|---|
| 300% Mod. p.s.i. | 60 | 1,700 | 1,650 | 1,850 | 1,500 |
| Tensile, p.s.i. | 60 | 4,200 | 3,700 | 3,700 | 3,900 |
| Elongation, percent | 60 | 550 | 530 | 500 | 570 |

[Mooney scorch at 302° F.]

| Cure rate, Mooney units/Minute | 12 | 12.5 | 7 | 9.5 |
|---|---|---|---|---|

It can be seen that cadmium salts can be used as activators of BMD vulcanization of SBR to great advantage over the conventional activator, zinc oxide; this is unexpected, in view of the deleterious influence of cadmium oxide on the vulcanization of SBR by the conventional TMTD (tetramethyl-thiuram disulfide) as shown below. TMTD is also a member of the class of non-elemental sulfur vulcanizing agents to which BMD belongs.

The compounding recipe given in Example I was used with the exception that 3.75 parts of tetramethylthiuram disulfide was used in place of the 2-benzothiazyl-N-morpholinyl disulfide.

| Cadmium oxide | 0.5 | 1.0 | 1.5 | 2.0 | 3.0 | 4.0 |
|---|---|---|---|---|---|---|
| CdO/TMTD mole ratio | 0.25 | 0.5 | 0.75 | 1.0 | 1.5 | 2.0 |

[Cure at 302° F.]

| | Minutes | | | | | | |
|---|---|---|---|---|---|---|---|
| 300% Mod. p.s.i. | 90 | 0 | 0 | 0 | 0 | 100 | 300 |
| Tensile, p.s.i. | 90 | 400 | 350 | 400 | 550 | 1,000 | 1,400 |
| Elongation, percent | 90 | 880 | 790 | 790 | 720 | 730 | 710 |

The above data illustrate that very little vulcanization of styrene-butadiene rubber by tetramethylthiuram disulfide occurs when cadmium oxide is used as activator.

I claim:

1. The composition comprising a mixture of 100 parts by weight of a styrene-butadiene rubber, from about 20 to 60 parts by weight of carbon black, from about 0.5 to about 10 parts by weight of an aminothiazole disulfide conforming to the structure

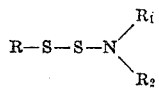

wherein R represents a thiazole radical having from 3 to 14 carbon atoms and $R_1$ and $R_2$ are selected from the class consisting of aliphatic radicals having from 1 to 4 carbon atoms, cycloaliphatic radicals having from 5 to 6 carbon atoms, aralkyl radicals having from 7 to 10 carbon atoms, and aliphatic radicals having from 2 to 5 carbon atoms wherein $R_1$ and $R_2$ are joined to form a single ring through a chalcogen atom having an atomic weight less than 33 and from about 0.1 to about 3 moles of a cadmium compound selected from the group consisting of cadmium carbonate, cadmium hydroxide, cadmium oxide, cadmium salicylate and a cadmium halide per mole of said aminothiazole disulfide.

2. The method for preparing a vulcanizate characterized by its unusual resistance to aging comprising blending at a temperature not exceeding 280° F. a mixture comprising 100 parts by weight of a styrene-butadiene rubber, from 20 to 60 parts by weight of carbon black, from about 0.5 to about 10 parts of an aminothiazole disulfide conforming to the structure

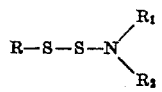

wherein R represents a thiazole radical having from 3 to 14 carbon atoms and $R_1$ and $R_2$ are selected from the class consisting of aliphatic radicals having from 1 to 4 carbon atoms, cycloaliphatic radicals having from 5 to 6 carbon atoms, aralkyl radicals having from 7 to 10 carbon atoms, and aliphatic radicals having from 2 to 5 carbon atoms wherein $R_1$ and $R_2$ are joined to form a single ring through a chalcogen atom having an atomic weight less than 33 and from about 0.1 to about 3 moles of a cadmium compound selected from the group consisting of cadmium carbonate, cadmium hydroxide, cadmium oxide, cadmium salicyclate and a cadmium halide per mole of said aminothiazole disulfide and curing said mixture at a temperature of from about 260 to 320° F.

3. The composition comprising the mixture of 100 parts by weight of a copolymer of from 55 to 85 weight percent butadiene and from 15 to 45 weight percent styrene; from about 20 to about 60 parts by weight of carbon black; from 0.5 to 10 parts by weight of 2-benzothiazyl-N-morpholinyl disulfide and from 0.1 to 3 moles of a cadmium compound selected from the group consisting of cadmium carbonate, cadmium hydroxide, cadmium oxide, cadmium salicylate and a cadmium halide per mole of said 2-benzothiazyl-N-morpholinyl disulfide.

4. The composition comprising a mixture of 100 parts by weight of a copolymer of about 71 weight percent of butadiene and about 29 weight percent styrene, from about 20 to about 60 parts by weight of carbon black, from 2 to 6 parts by weight of 2-benzothiazyl-N-morpholinyl disulfide and from about 0.2 to 2 moles of cadmium carbonate per mole of said 2-benzothiazyl-N-morpholinyl disulfide.

5. The composition comprising a mixture of 100 parts by weight of a copolymer of about 71 weight percent of butadiene and about 29 weight percent styrene, from about 20 to about 60 parts by weight of carbon black, from 2 to 6 parts by weight of 2-benzothiazyl-N-morpholinyl disulfide and from about 0.2 to 2 moles of cadmium hydroxide per mole of said 2-benzothiazyl-N-morpholinyl disulfide.

6. The composition comprising a mixture of 100 parts by weight of a copolymer of about 71 weight percent of butadiene and about 29 weight percent styrene, from about 20 to about 60 parts by weight of carbon black, from 2 to 6 parts by weight of 2-benzothiazyl-N-morpholinyl disulfide and from about 0.2 to 2 moles of cadmium oxide per mole of said 2-benzothiazyl-N-morpholinyl disulfide.

7. The composition comprising a mixture of 100 parts by weight of a copolymer of about 71 weight percent of butadiene and about 29 weight percent styrene, from about 20 to about 60 parts by weight of carbon black, from about 2 to 6 parts by weight of 2-benzothiazyl-N- morpholinyl disulfide and from about 0.2 to 2 moles of cadmium salicylate per mole of said 2-benzothiazyl-N-morpholinyl disulfide.

8. The composition comprising a mixture of 100 parts by weight of a copolymer of about 71 weight percent of butadiene and about 29 weight percent styrene, from about 20 to 60 parts by weight of carbon black, from about 2 to 6 parts by weight of 2-benzothiazyl-N-morpholinyl disulfide and from about 0.2 to 2 moles of cadmium chloride per mole of said 2-benzothiazyl-N-morpholinyl disulfide.

References Cited in the file of this patent

UNITED STATES PATENTS

| | | |
|---|---|---|
| 2,476,818 | Carr et al. | July 19, 1949 |
| 2,835,670 | Hardman | May 20, 1958 |